United States Patent
Albrecht et al.

(10) Patent No.: US 6,331,920 B1
(45) Date of Patent: Dec. 18, 2001

(54) BACKWARD COMPATIBLE HEAD AND HEAD POSITIONING ASSEMBLY FOR A LINEAR DIGITAL TAPE DRIVE

(75) Inventors: Laurence J. Albrecht, Louisville, CO (US); George A. Saliba, Northboro, MA (US)

(73) Assignee: Quantum Corporation, Milpitas, CA (US)

( * ) Notice: Subject to any disclaimer, the term of this patent is extended or adjusted under 35 U.S.C. 154(b) by 0 days.

(21) Appl. No.: 09/685,418

(22) Filed: Oct. 10, 2000

Related U.S. Application Data

(63) Continuation of application No. 09/149,733, filed on Sep. 8, 1998, now Pat. No. 6,188,532.

(51) Int. Cl.[7] .................................................. G11B 15/12
(52) U.S. Cl. .................. 360/63; 360/76; 360/75; 360/69; 360/62; 360/61; 360/77.12; 360/251.1; 360/261.3; 360/291.2
(58) Field of Search ............................... 242/344; 360/88, 360/93, 94, 76, 75, 69, 122, 130.21, 63, 62, 61, 48, 77.12, 78.02, 240, 250, 251.1, 260, 261.1, 261.3, 290, 291, 291.2

(56) References Cited

U.S. PATENT DOCUMENTS

| | | | |
|---|---|---|---|
| 5,353,176 | * 10/1994 | Kosuge | 360/63 |
| 5,371,636 | 12/1994 | Nayak et al. . | |
| 5,371,638 | 12/1994 | Saliba . | |
| 5,452,152 | 9/1995 | Rudi . | |
| 5,769,346 | 6/1998 | Daly . | |
| 5,774,306 | 6/1998 | Wang et al. . | |
| 5,867,339 | 2/1999 | Panish et al. . | |
| 6,084,740 | * 7/2000 | Leonhardt et al. | 360/78.02 |
| 6,188,532 | * 2/2001 | Albrecht et al. | 360/63 |

\* cited by examiner

Primary Examiner—Alan T. Faber
(74) Attorney, Agent, or Firm—Steven G. Roeder

(57) ABSTRACT

A tape recording and playback unit records and reads back data from tape either in a high track density standard format or alternatively reads back data from a tape previously recorded on another unit in accordance with a previous low density standard track format. The unit includes a primary head positioning mechanism for positioning a primary multi-channel write/read head and a secondary head positioning mechanism for positioning a secondary read-only head. The secondary head may be positioned angularly to read longitudinal and azimuth track patterns, and also to be retracted when not needed.

28 Claims, 6 Drawing Sheets

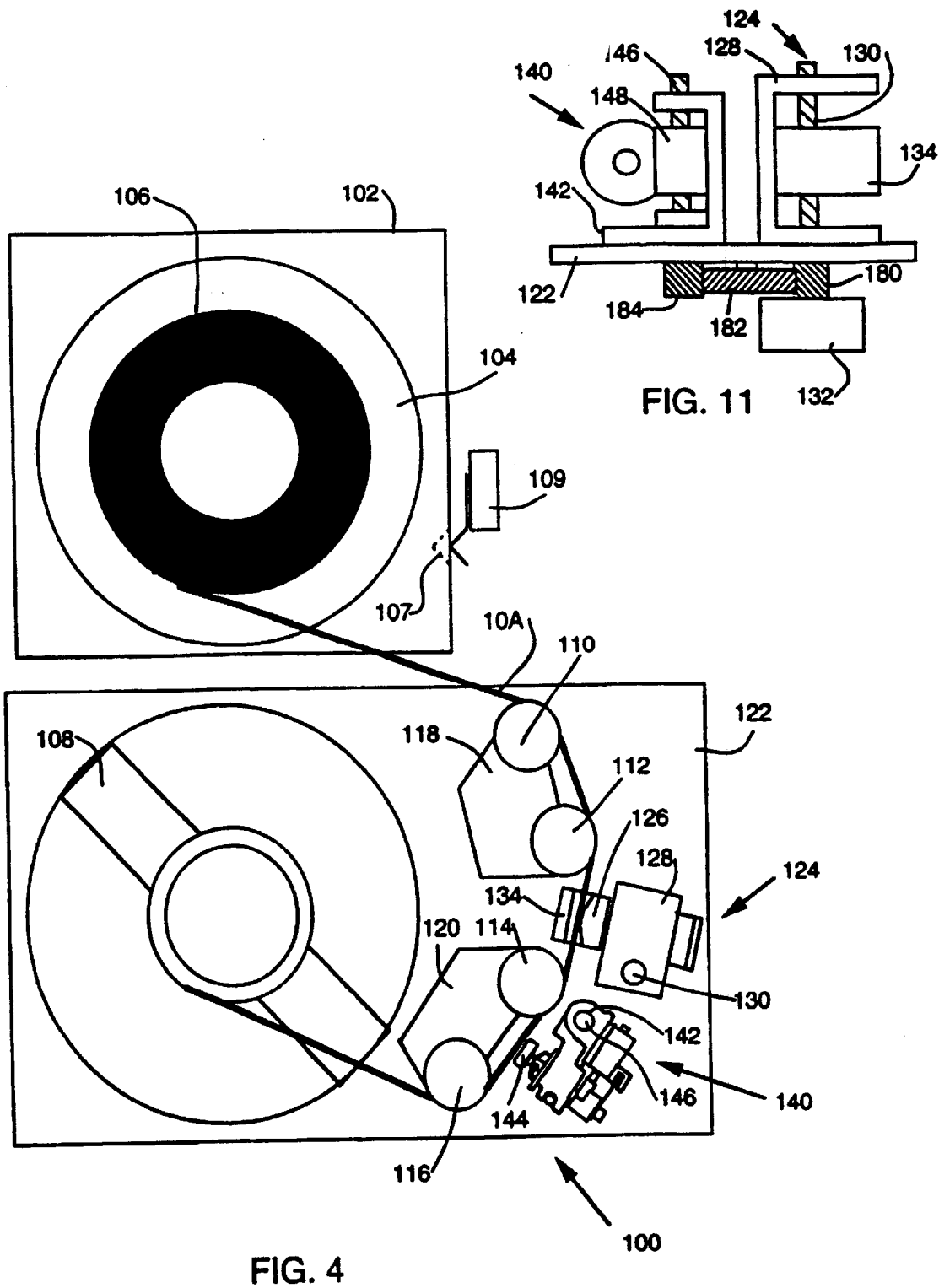

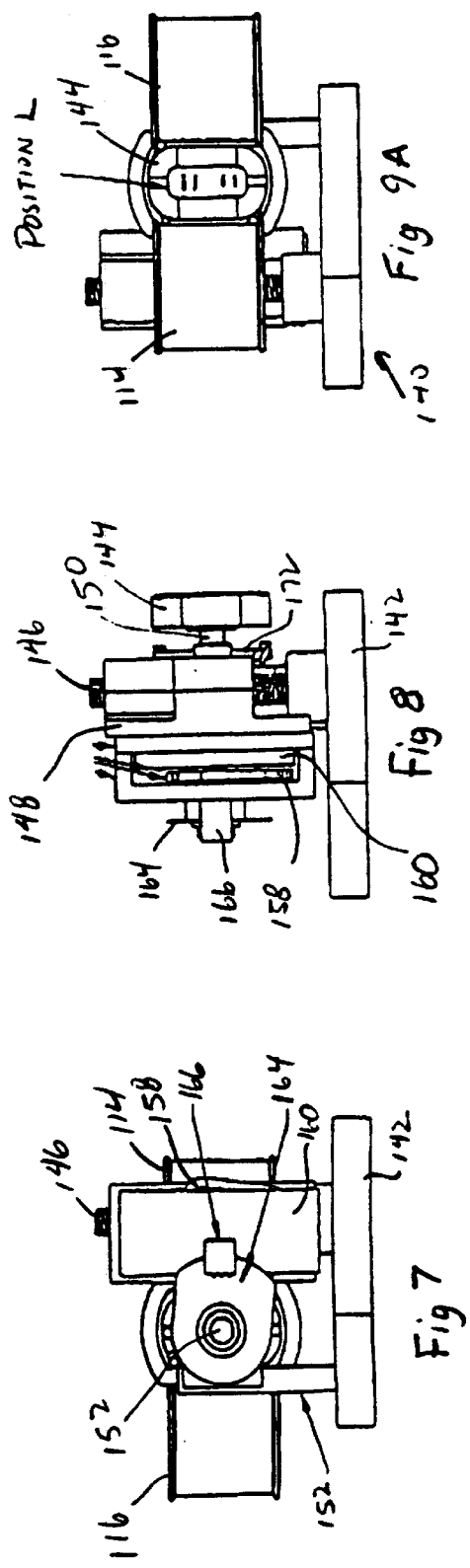
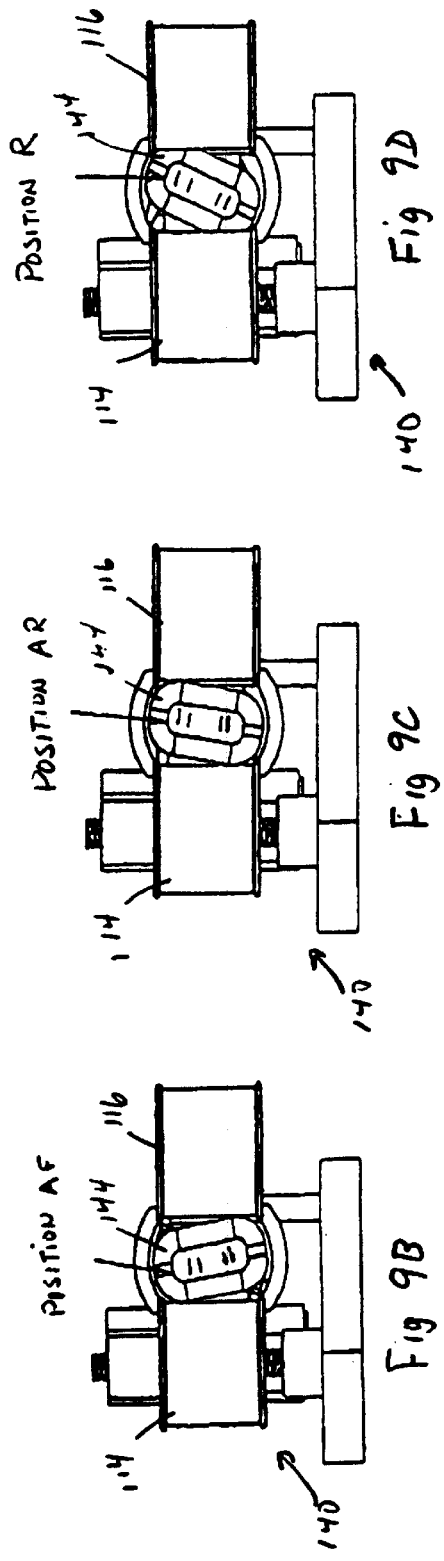

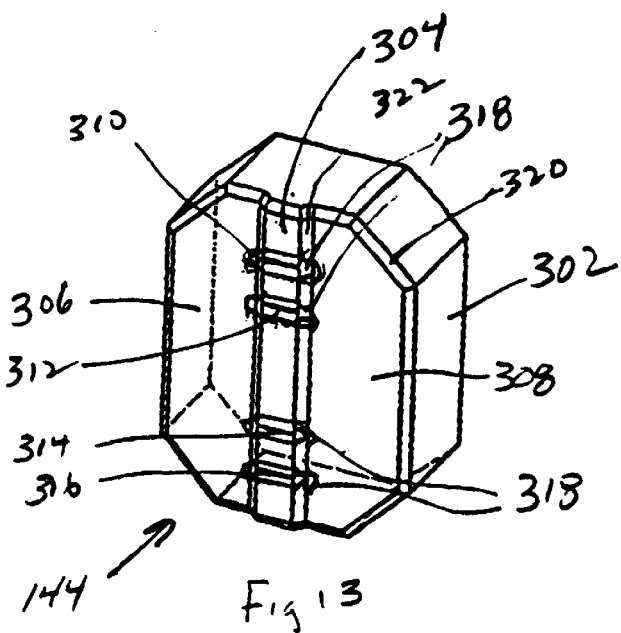
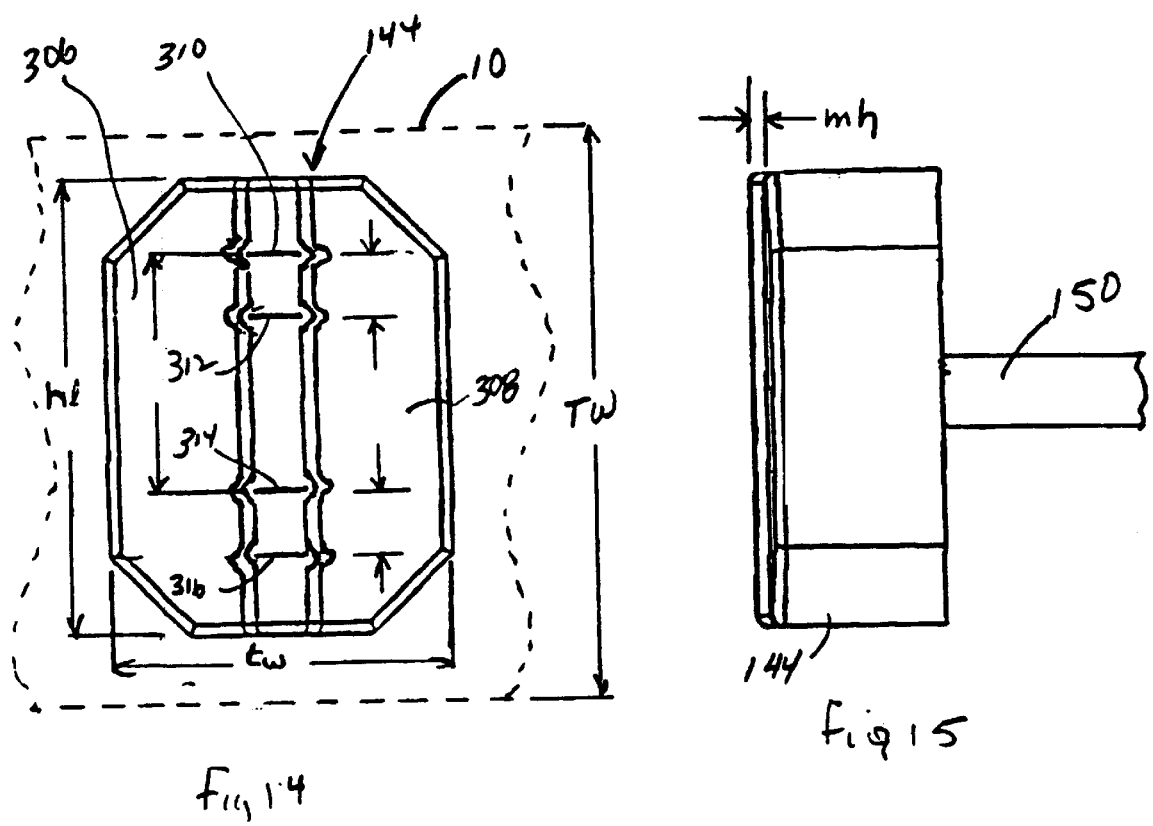

BACKWARD COMPATIBLE HEAD AND HEAD POSITIONING ASSEMBLY FOR A LINEAR DIGITAL TAPE DRIVE

REFERENCE TO RELATED APPLICATION

This is a continuation application of U.S. patent application Ser. No. 09/149,733, filed on Sep. 8, 1998, now U.S. Pat. No. 6,188,532, and entitled: "BACKWARD COMPATIBLE HEAD AND HEAD POSITIONING ASSEMBLY FOR A LINEAR DIGITAL TAPE DRIVE". The contents of U.S. patent application Ser. No. 09/149,733 are incorporated herein by reference.

FIELD OF THE INVENTION

The present invention relates to tape drives, and more particularly the present invention relates to a linear digital tape drive having a backward-compatible auxiliary head and head positioning assembly enabling read back of outdated standard tape formats.

BACKGROUND OF THE INVENTION

Magnetic tape is widely used for recording digital information. One extensive use of digital tape recording is to provide backup and archival storage of vast quantities of digital information, such as records comprising blocks of data. In some applications archival records are recorded on tape in a particular tape format which follows agreed standards at the time the recording was made. The tape may then be placed into archival storage and not retrieved until months or years have passed by. It is not uncommon to specify the useful storage life of recorded digital tapes and cartridges at thirty years, or longer. Whatever may be the useful life of a particular magnetic tapes, a primary assumption on the part of those who store such tapes away is that the recorded information may be read at some date in the future, if access to the archived data is required.

While a particular tape and cartridge may remain functional over many years after being in archival storage, tape transport mechanisms typically do not last nearly so long. Standardized tape recording formats are also susceptible to evolutionary changes and improvements. These changes are primarily driven by improvements in magnetic tape and magnetic head technologies which enable much larger data records and files to be stored on a given area of magnetic tape. One recent development, first employed in the hard disk drive industry, and more recently applied to tape recording, has been the introduction of head assemblies formed of thin film inductive, and magneto-resistive, and giant magneto-resistive (MR) read elements. These elements are typically fabricated in processes including photolithographic patterning steps of the type first developed for use by the semiconductor industry. One desirable aspect of these new thin film MR heads is that head gap widths may be narrowed considerably. Narrower head gaps and finer grain magnetic media coatings on tape mean that many more lineal data tracks may be defined across a magnetic recording tape of a standard given width (such as one-half inch tape). Also, the head structure may be formed as a single small composite structure on a common base or substrate and have as many as 12, or more, distinct heads. By using a common substrate, the heads may be formed to be in a predetermined precise alignment relative to nominal track locations defined along the magnetic tape. With e.g. 12 write and read head elements of the head structure in precise alignment with the defined nominal track locations, and with large scale integrated chips providing multiple data write/read channels, it has now become practical to have e.g. 12 channels for simultaneously writing user data to tape and for reading user data back from tape. This increase in the number of write/read channels effectively increases the overall data transfer rate between a host computer and the tape drive, and enables the tape drive to be characterized as having higher performance than previously available.

In order to take full advantage of the new thin film MR head technology in tape drives, a track layout which differs from previous standard track formats is required. This new track layout employs tracks of much narrower track width and pitch. Since the write/read heads are grouped together on a common fabrication substrate, the data tracks are also grouped together. In one arrangement, the data tracks are grouped into bands, or zones, across the tape, such that e.g. ten lateral head positions relative to the tape within a single zone would access 120 tracks. When a zone boundary is reached, the head structure or assembly is then displaced laterally relative to the tape travel path to the next zone, and the tracks of that zone then become accessible. Because track widths are very narrow, enabling track densities of e.g. 2000 tracks per inch, or higher, lateral tape motion must be followed in order to keep the new head assemblies in alignment with the tracks during tape travel past the head. Magnetic servo patterns written onto the tape may be read by servo readers and used to generate position error signals used by a closed loop positioner to correct head position. Alternatively, optical servo patterns embossed or otherwise formed on a back side of the tape may be used to provide position error signals, as disclosed for example in commonly assigned, co-pending U.S. patent application Ser. No. 09/046,723 filed on Mar. 24, 1998, and entitled: "Multi-Channel Magnetic Tape System Having Optical Tracking Servo", the disclosure thereof being incorporated herein by reference.

The later high-density track format differs from previous standard formats. For example, FIG. 1 shows an existing standard tape format employing longitudinal recording. In this example a magnetic recording tape 10 has a series of parallel longitudinal tracks. Three tracks 12A, 12B and 12C are shown in the FIG. 1 example, although more tracks, such as 24, 48, 96 or 128 tracks may be employed in a one-half inch tape lineal format in accordance with a particular standardized track layout plan. A head assembly 14 includes e.g. discrete inductive read or write head elements 14A, 14B and 14C which are aligned with the tracks 12A, 12B and 12C. Other tracks may be accessed by displacing the head assembly 14 laterally relative to the direction of the tape along a path indicated by the vertical arrows axial aligned with the head 14 in the FIG. 1 view.

Another preexisting standard tape format employs azimuth recording of the data tracks, i.e. adjacent tracks are recorded with magnetic gaps oblique to each other, creating what appears generally as a "herringbone" pattern, shown in FIG. 2. Therein, one track 16A has its magnetic flux reversal pattern aligned with a first azimuth angle oblique to the tape travel direction, and an adjacent track 16B has its magnetic flux reversal pattern aligned with a second azimuth angle in an opposite sense of the first angle relative to a travel path of the magnetic tape 10. One known advantage derived from azimuth recording is that lineal guard bands or regions between tracks may be reduced, and the tracks may be placed closer together and read back without interference from adjacent tracks. While azimuth recording technology increases track density somewhat, complications arise in writing and reading the slanted tracks. Multi-element tape heads, such as the tape head 100 shown in FIGS. 4–6 of U.S.

Pat. No. 5,452,152, can be provided with some of the write/read elements having magnetic gaps aligned with one azimuth angle, and other write/read elements having magnetic gaps aligned with the other azimuth angle. Such heads are then positioned laterally relative to the direction of tape travel in order to come into alignment with particular tracks. An alternative approach, also shown in FIG. 2 and enabling compatibility with both the longitudinal tracks 12A, 12B and 12C of the FIG. 1 example, and the azimuth tracks 16A and 16B of the FIG. 2 example, calls for rotating a head 19 having perpendicular head elements 19A and 19B between the two azimuth formats and the longitudinal format. One example of a multi-element head is given in commonly assigned, co-pending U.S. patent application Ser. No. 08/760,794, now U.S. Pat. No. 6,867,339, filed on Dec. 4, 1996, and entitled: "Four Channel Azimuth and Two Channel Non-Azimuth Read-After-Write Longitudinal Magnetic Head", the disclosure thereof being incorporated herein by reference. An example of an azimuth tape recording pattern and an apparatus for writing the pattern in accordance with servo information read back from an adjacent track is given in commonly assigned U.S. Pat. No. 5,371,638, the disclosure thereof being incorporated by reference.

FIG. 3 illustrates a newer track format plan employing a tape 10A carrying high recording density magnetic media. According to the FIG. 3 track plan, a multiplicity of data tracks 20n are distributed across e.g. five zones 22A, 22B, 22C, 22D and 22E. A monolithic thin film head element 24 within the head assembly includes e.g. 12 write-read elements in relatively close proximity enabling writing to and reading from tracks of a particular zone, e.g. zone 22D in the FIG. 3 example. Other zones may be accessed by displacing the head assembly laterally relative to the direction of travel of tape 10A. Further details of a tape and tape drive in accordance with this general approach may be found in the above-referenced U.S. patent application Ser. No. 09/046,723.

While the standardized longitudinal recording patterns shown in the FIG. 1 example, and the azimuth recording patterns shown in the FIG. 2 example, have worked very well for a number of years, newer higher density track layout patterns and plans, enabled by multi-element thin film head as well as improvements in tape media technologies are now proposed and will most likely become standard approaches in the future for certain categories of longitudinal digital tape recording methods and devices. Since extensive cartridge handling equipment in use is capable of handling standard cartridges containing tape having the newer format, no compelling need has arisen to change the cartridge form factor or major features in order to accommodate the new tape track formats enabled by emerging new technologies. Yet, a hitherto unsolved need has remained for backward compatibility within tape drive units having monolithic multi-element heads by enabling reading back of older preexisting tape formats recorded on tape carried in standard tape cartridges, but based on discrete head elements, in order to recover archival data recorded on the older tapes.

SUMMARY OF THE INVENTION WITH OBJECTS

A general object of the present invention is to provide a backward compatible head and head positioning assembly within a linear digital tape drive in a manner overcoming limitations and drawbacks of prior approaches.

Another object of the present invention is to enable a linear digital tape drive primarily adapted to recording and reading back of track patterns of standard cartridge tape recorded in a higher density track format to also be able to read back older lower density track patterns of archival standard cartridge tape in order to be able to retrieve archived user data.

Yet another object of the present invention is to provide a secondary head positioning and read-only tape head module for backward compatibility in reading tape recorded in a low density format and carried in standard tape cartridges as well as to provide a primary head positioning and write-read tape head module for forward compatibility in reading tape recorded in a high density format and carried in the same type of standard tape cartridges.

One more object of the present invention is to provide a "button-shaped" multi-element magnetic recording head which is capable of contacting a magnetic tape at a very slight tape wrap angle, and which may be rotated between positions aligning a magnetic recording gap of an element of the head with both longitudinal and azimuthal recording patterns of a lineal data track recorded on the tape.

One more object of the present invention is to provide a tape head having side wings and dimensions less than tape width such that the tape head floats in close proximity to a tape with minimized contact, ensuring effective operation with both longitudinal and azimuthal recording patterns as well as minimal wear and reliable long useful life.

Accordingly, a tape recording and playback unit is provided for recording and playing back digital data recorded along a multiplicity of parallel longitudinal data tracks of a magnetic storage tape. The tracks are arranged in accordance with a standardized high density track layout in which the tracks have much smaller track widths and are much more closely spaced together than tracks defined by older lower density standard tape track formats. The unit includes a base, and has a take-up reel. In one preferred form, the unit receives a single reel cartridge and couples to an outer end of a tape supply held on a supply reel of the cartridge and threads the tape along a tape path defined by plural guide rollers within the unit until the take-up reel is reached.

In order to write to and read from tape tracks in accordance with the standardized high density track layout, the unit is equipped with a primary head positioning mechanism. The primary mechanism is referenced to the base and presents a multi-channel primary write/read head assembly to the tape along the tape path. A coarse servo, preferably including a lead screw and nut follower provides coarse elevational control to the primary write/read head assembly. A fine position servo, preferably including a voice coil motor carried on a body of the nut follower provides fine adjustments to head position in accordance with position error signals. Most preferably, the position error signals are provided via an optical sensor reading optical servo patterns formed on a back side of the high density tape.

In order to provide backward compatibility with lower density standard tape track layouts, a secondary head positioning mechanism is also provided within the unit. The secondary head positioning mechanism supports and positions a read-only secondary head assembly relative to the tape. The secondary head positioning mechanism also preferably includes a coarse positioner for elevational positioning. In one preferred form, the secondary head positioning mechanism also includes a mechanism for rotating the head to enable read back of longitudinal recording, azimuth recording, and to assume a retract position when a tape recorded with a lower density standard track pattern is not present. Most preferably, the coarse positioner of the secondary mechanism is mechanically coupled to the coarse positioner of the primary mechanism, in order to eliminate a second coarse positioner motor. Coupling via spur gearing between the two mechanisms is presently preferred. The electronics of the unit may be switched between the primary mechanism and the secondary mechanism, based upon sensing a particular track format standard type. In one preferred form, format sensing is by way of a unique structural feature provided on an otherwise standard tape cartridge, such that the feature distinguishes between high density and low density tape track standard formats.

A secondary read-only head body has a dimension less than a width of the tape and employs a minimized tape wrap angle. The head body has side wings enabling the head to "float" adjacent to the tape at the minimum wrap angle and effectively operate at longitudinal as well as azimuth play back angles.

These and other objects, advantages, aspects, and features of the present invention will be more fully appreciated and understood upon consideration of the following detailed description of preferred embodiments presented in conjunction with the accompanying drawings.

BRIEF DESCRIPTION OF THE DRAWINGS

In the Drawings:

FIG. 4 is simplified diagrammatic plan view of a tape drive and data tape cartridge wherein the tape drive includes a backward-compatible head and head positioning mechanism adapted to read the first and second preexisting industry standard tape formats as well as a high-density multichannel head and head positioning mechanism adapted to read and write the new high-density recording format, in accordance with principles of the present invention.

FIG. 7 is a back side view in elevation of the FIG. 5 head and positioning mechanism.

FIG. 8 is a side view in elevation of the FIG. 5 head and positioning mechanism.

FIG. 9A is a front view in elevation of the FIG. 5 head and positioning mechanism in a perpendicular orientation relative to tape travel for playback of longitudinally recorded data tracks in accordance with the FIG. 1 format.

FIG. 9B is a front view in elevation of the FIG. 5 head and positioning mechanism in a first azimuth orientation relative to tape travel in e.g a forward direction for playback of one set of azimuthally recorded data tracks in accordance with the FIG. 2 format.

FIG. 9C is a front view in elevation of the FIG. 5 head and positioning mechanism in a second azimuth orientation relative to tape travel in a reverse direction for playback of a second set of azimuthally recorded data tracks in accordance with the FIG. 2 format.

FIG. 9D is a front view in elevation of the FIG. 5 head and positioning mechanism in a third azimuthal orientation assumed by the head at a head retract position.

FIG. 11 is a diagrammatic view in elevation of the spur-gear coupling arrangement between the lead screws of the main head positioning mechanism and the backward-compatible positioning mechanism of the FIG. 4 tape drive.

FIG. 13 is an enlarged isometric view of the backward-compatible head of the FIG. 4 tape drive.

FIG. 14 is an enlarged front view in elevation of the FIG. 13 head.

FIG. 15 is an enlarged side view in elevation of the FIG. 13 head.

DETAILED DESCRIPTION OF PREFERRED EMBODIMENTS

Figure 1:
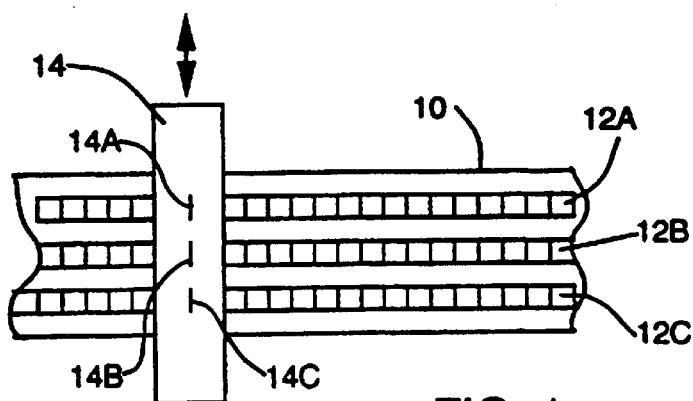
FIG. 1 is a highly diagrammatic elevational view of a segment of magnetic data storage tape recorded with a series of lineal tracks employing longitudinal recording in accordance with a first preexisting industry standard tape format.

Referring to the drawings, where like reference numerals designate like or corresponding parts throughout the views, FIG. 4 presents a tape unit 100 and single-reel tape cartridge 102. The cartridge 102 includes a supply reel 104 and a pancake 106 of spooled magnetic recording tape 10A, capable of being written at a high track density. Tape cartridge 102, while occupying the same physical envelope or form factor as prior standards cartridges, has at least one unique structural feature, such as a uniquely located "beginning of tape" (BOT) hole in accordance e.g. with commonly assigned U.S. Pat. No. 5,790,337 to Steinberg et al., and entitled: "Tape Cartridge Qualified by Location, and Identified by Geometry, of Type Aperture", the disclosure thereof being incorporated herein by reference. Alternatively, the cartridge 102 may be provided with a structural feature comprising a uniquely located notch 107, for identifying the tape 10A as high density recording tape. A tape-type sensor 109 associated with a cartridge receiver portion of the tape unit 100 may be provided to sense the notch 107 and thereby to inform electronics of the unit of the particular tape type. Other physical features, such as an embossed optical servo pattern formed on a back side of the tape may also provide a unique structural feature for indicating a high track density tape. When a unique BOT hole, or the notch 107, is not sensed at a particular cartridge, the unit 100 is alerted that the tape format (if any) of the particular cartridge is in accordance with a prior standards track format, and calls for use of an auxiliary read-only capability present within the unit 100. An outer end of the tape pancake 106 is buckled by a suitable buckling mechanism to a leader extending from a take-up reel 108 of the tape unit 100. A presently preferred form of tape buckling mechanism is describe in commonly assigned, co-pending U.S. Pat. No. 5,971,310, filed on the same date as this application and entitled: "Positive Engagement Buckle for a Tape Drive and Cartridge", the disclosure thereof being incorporated herein by reference. An alternative form of buckling mechanism is described in commonly assigned U.S. Pat. No. 5,769,346 to Daly, and entitled: "Tape Buckling Mechanism for Single Reel Cartridge Tape Recording", the disclosure thereof being incorporated herein by reference. A tape supply reel motor 242 and a take-up reel motor 244 are provided in the tape unit 100 (see FIG. 12) but are not shown in the FIG. 4 diagrammatic plan view.

Figure 3:
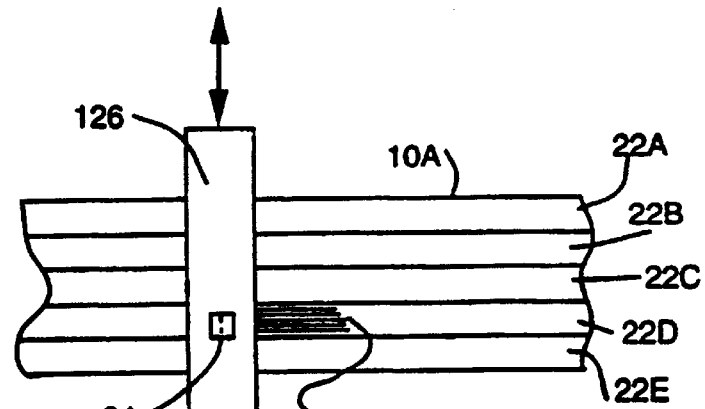
FIG. 3 is a highly diagrammatic elevational view of a segment of magnetic data storage tape recorded with a multiplicity of high density lineal tracks in accordance with a new high-density recording format.

Four tape guide rollers 110, 112, 114 and 116 guide the tape 10A from the supply reel 106 to the take-up reel 108. Two of the rollers 110 and 112 are formed on a frame 118, and two of the rollers are mounted to a frame 120. The frames 118 and 120 are secured to a base 122 of the unit 110. A primary head positioning mechanism 124 is secured to the base 122 at a location between guide rollers 112 and 114. The primary positioning mechanism 124 includes a primary multi-channel write/read head assembly 126 for writing and reading user data onto and from the tape 10A in accordance with a standardized higher density track layout, e.g. of the FIG. 3 type. The mechanism 124 also includes a frame 128 supporting a rotating primary lead screw 130. A stepper motor 132, shown in FIG. 11, rotates the primary lead screw 130. A primary head block 134 displaces the primary head 126 laterally across the tape 10A as the primary lead screw 130 is rotated by the stepper motor 132.

In this particular tape unit 100, the high density tape 10A includes longitudinal servo patterns or tracks formed on the back side thereof e.g. during manufacturing. An optical servo head 134 also mounted to the primary head block 134 adjacently faces a back side of the tape 10A and optically senses the longitudinal servo patterns in order to generate position error signals which are fed into a fine position servo loop (FIG. 12) and result in voice coil driving currents applied to operate a primary voice coil motor 136, also a part of the primary head block 134. During data writing and reading operations, the fine position servo loop keeps the primary head 126 in alignment with the data track locations in the presence of disturbances, such as lateral tape motions and vibrations imparted to the tape 10A along the tape path. As already noted, the optical servo patterns formed on the back side of a high density tape 10A may be sensed to determine that a particular cartridge contains high density format tape.

Also present in the FIG. 4 plan view is a secondary head positioning mechanism 140. As may be seen in greater structural detail in FIGS. 5–9, the secondary mechanism 140 includes a frame 142 which may be secured to the base 122 of the tape unit 100. Preferably, the mechanism 140 is formed as a unitary module which may be attached to and removed from the base 122 as a single unit. Suitable electrical plugs and cables enable the mechanism 140 to make necessary electrical connections with the tape unit 100. The mechanism 140 selectively positions a secondary read-only head assembly 144 adjacent to the tape 10A along the tape path at a location between the guide rollers 114 and 116. The secondary mechanism 140 also includes a secondary lead screw 146 rotatably mounted to the frame 142 and a secondary head block 148 having a follower-nut portion engaging the secondary lead screw 146 such that as the screw 146 rotates, the head block 148 is translated elevationally relative to the frame 142. The secondary head block 148 rotatably mounts a lateral head shaft 150 which has one end thereof secured to the secondary head assembly 144. A guide post 152 extending from the frame 142 is followed by a guide post follower portion 154 of the secondary block 148 to prevent the block from rotating relative to the frame 142 as the secondary lead screw 146 is rotated.

Figure 10:
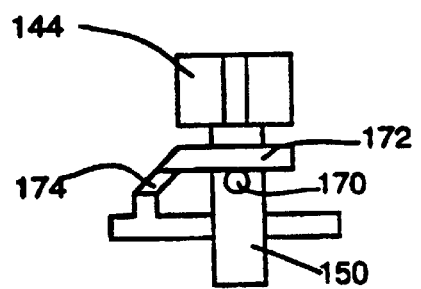
FIG. 10 is an enlarged diagrammatic plan view of the retract mechanism of the FIG. 5 head and positioning mechanism.
Figure 5:
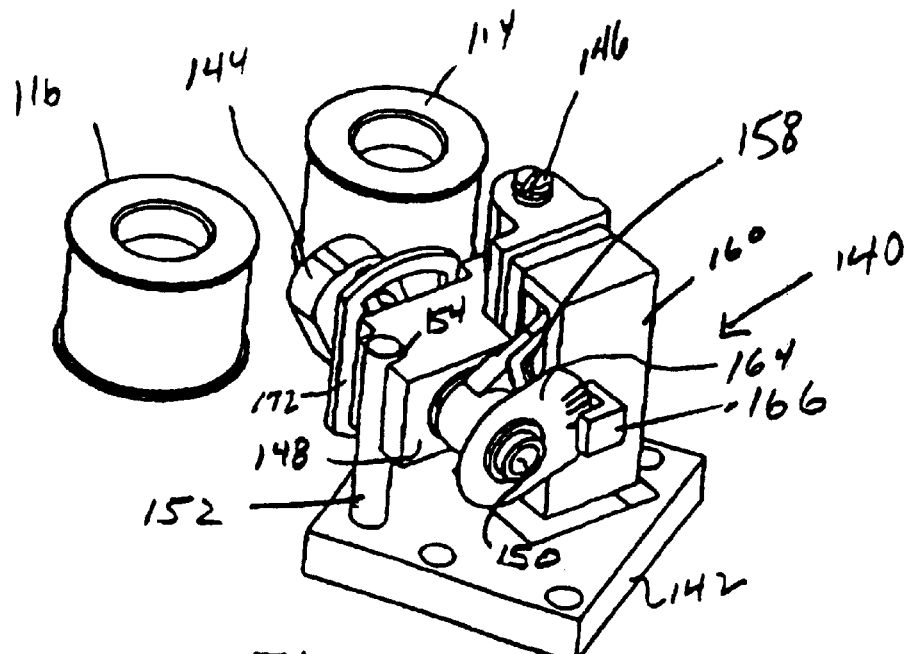
FIG. 5 is an enlarged isometric view of the backward-compatible head and head positioning mechanism shown in the FIG. 4 tape drive, in accordance with principles of the present invention.
Figure 6:
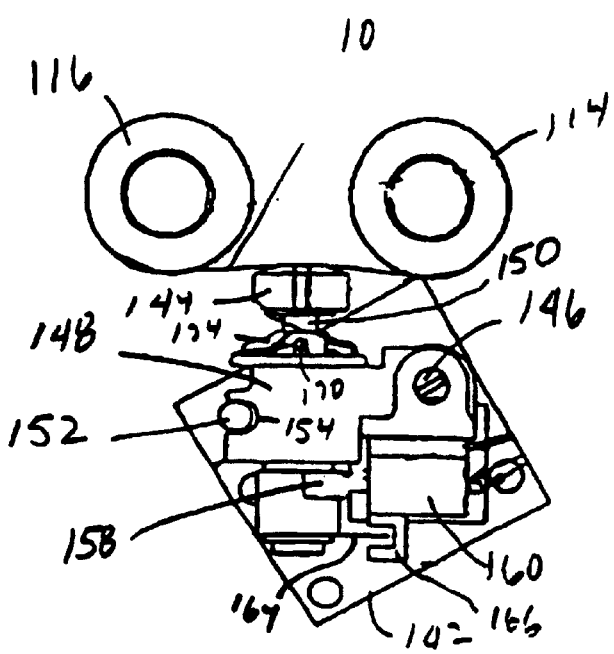
FIG. 6 is a top plan view of the FIG. 5 head and positioning mechanism.

The lateral head shaft 150 is rotated by e.g. a rotary voice coil motor 156 comprising a voice coil 158 attached to the shaft 150 and a stator magnet assembly 160 attached to the secondary block 148. Driving current applied to the voice coil 158 causes the shaft 150 to rotate between e.g. four positions: retract, azimuth forward, longitudinal, and azimuth reverse. An optical encoder 162 provides an optical feedback signal marking the angular location of each shaft position. The encoder 162 comprises a rotating reticle plate 164 mounted to the head shaft 150 and a photo detector unit 166 mounted to the stator magnet assembly 160. As shown in FIG. 10 a retract mechanism includes a pin 170 extending radially from the shaft and a pin guide 172 mounted to the secondary block 148 adjacent the secondary head 144. The generally annular pin guide 172 includes an angled and stepped-in region 174. The stepped-in region 174 is located such that when the shaft 150 is at the retract angle, the angled portion of the stepped-in region 174 forces the shaft 150 to move axially away from the tape path and thereby retracts the secondary head 144 from contact proximity with the tape. The stepped-in region 174 may optionally include a detent feature for positively maintaining the shaft 150 at the retract position in the absence of any release rotational force applied by the voice coil motor 156. A bias spring (not shown) preferably applies an axial bias force to the shaft 150 to urge it axially toward the tape confronting position and away from the stepped-in retract position.

FIGS. 9A, 9B, 9C and 9D show the four nominal angular positions capable of being assumed by the secondary head 144. A normal or perpendicular to tape travel direction position L is shown in FIG. 9A for use in reading longitudinally written data tracks as per the FIG. 1 format, for example. An azimuth forward angle position is shown in FIG. 9B, and an azimuth reverse angle position is shown in FIG. 9C. These positions are used for reading azimuth track patterns shown by way of example in FIG. 2. The forward angle position is assumed in reading azimuth record tracks while the tape moves in a forward direction from supply reel 104 to take-up reel 108, while the reverse angle position is assumed in reading azimuth record tracks while the tape moves in a reverse direction from take-up reel 108 back onto supply reel 104. A stepped-in retract position R is shown in FIG. 9D and represents the angular position of the head 144 while retracted from operative proximity to the tape 10A, as shown in the FIG. 4 plan view, for example.

The secondary read-only head assembly 144 most preferably comprises four read elements 310, 312, 314 and 316 (shown in FIGS. 13 and 14). A preamplifier IC including a preamplifier for each of the read elements is included on a flex circuit forming a part of the modular secondary head positioning mechanism 140. Suitable electrical connectors (not shown) are provided to connect the circuitry of the secondary head positioning mechanism to circuit board electronics of the tape unit 100.

FIG. 11 illustrates one preferred form of mechanical coupling between the primary lead screw 130 and the secondary lead screw 146. In this example, a spur gearing arrangement includes a driver gear 180 attached to the primary lead screw 130. An idler gear 182 engages the driver gear 180 and transfers rotational force to a follower gear 184 secured to the secondary lead screw 146. The idler gear 182 rotates about a shaft 186 mounted to the base 122 of tape unit 100 at a location e.g. equidistant from axes of rotation of the primary lead screw 130 and the secondary lead screw 146 thereby transferring rotational force imparted by stepper motor 132 to both lead screws 130 and 146.

Figure 12:
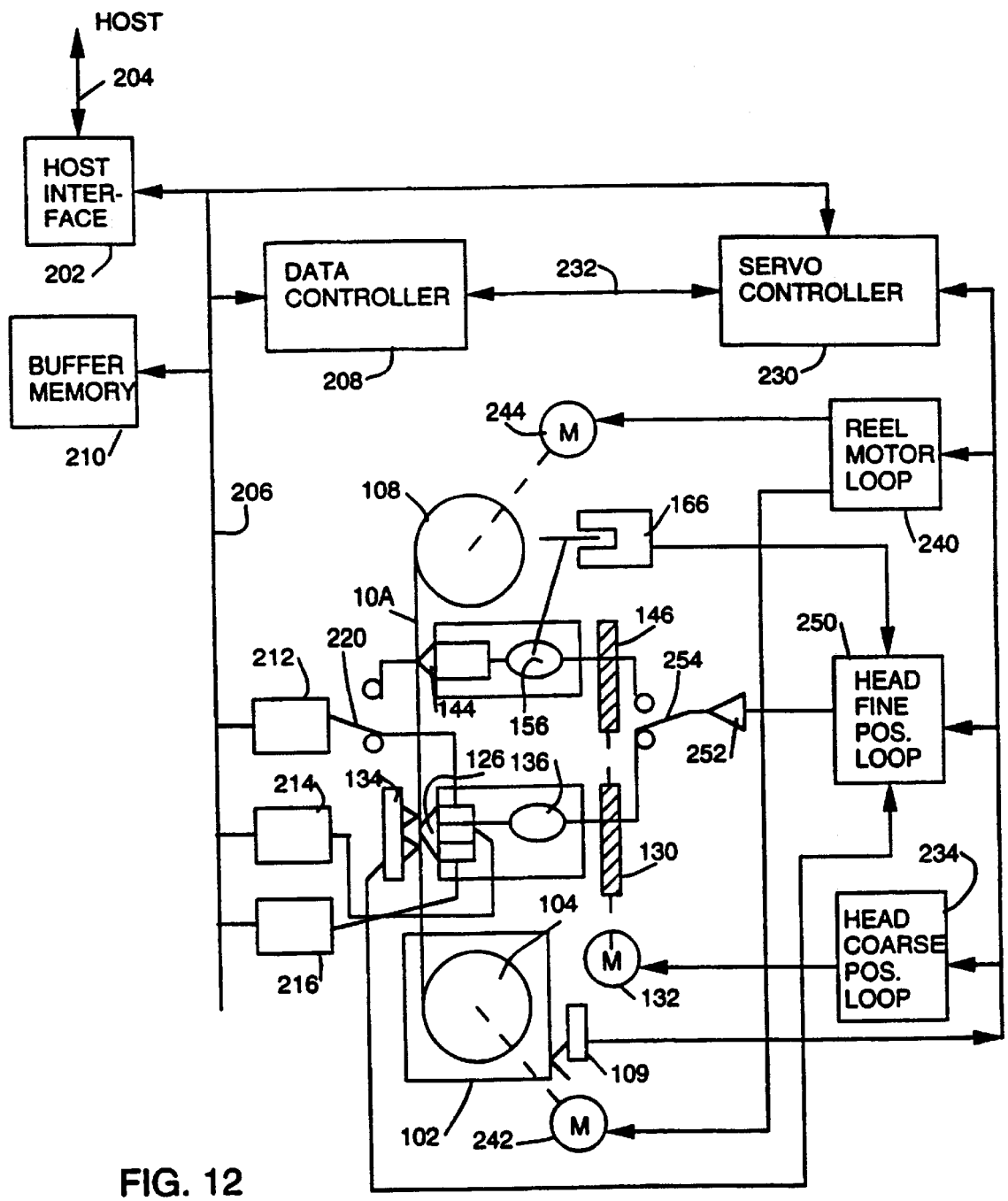
FIG. 12 is a simplified electrical block diagram of the FIG. 4 tape drive.

FIG. 12 sets forth a simplified block diagram of the electronics of the tape unit 100. In pertinent part, the unit 100 includes a user data handling section and a mechanisms section. In FIG. 12, the user data handling functional blocks are drawn the left side of a diagrammatic tape path, while the servo mechanisms functional blocks are drawn on the right side of the tape path. The user data handling blocks include a user interface 202 which interfaces the unit 100 to a host computing environment via a standard bus signaling convention, such as a low voltage differential SCSI bus 204. The interface block 202 connects to an internal user and control data bus 206. Also attached to the internal bus are a programmed data controller 208 and a block buffer memory 210. The data controller 208 regulates and controls block formatting and performs error correction coding and decoding upon blocks written to and read back from the tape 10 (or 10A). Blocks are assembled and deconstructed in the buffer memory 210 under direct control of the data controller 208. Four-channel data write/read ICs 212, 214 and 216 support the multi-channel primary head assembly 126 and one of the ICs 212 selectively supports read-only elements of the secondary read head assembly 144. A switch 220 switches read paths of the IC 212 from the primary head 126 to the secondary head 144 whenever a lower density standard format tape is sensed within the unit 100.

The unit 100 also includes a programmed servo controller 230. The servo controller 230 has a bus 232 enabling the data controller 208 to pass commands to the servo controller 230, and enabling the servo controller to pass status information back to the data controller 208. In some embodiments where servo information embedded in magnetic data tracks is present, a connection may also exist between the servo controller 230 and the channels 212, 214 and 216 via the data/control bus 206.

Figure 2:
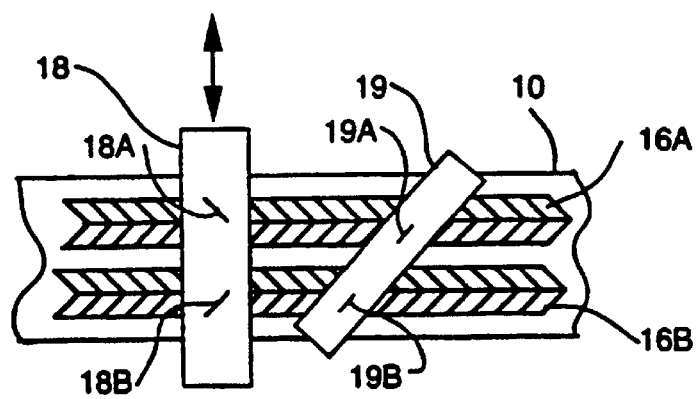
FIG. 2 is a highly diagrammatic elevational view of a segment of magnetic data storage tape recorded with a series of lineal tracks employing azimuth recording in accordance with a second preexisting industry standard tape format.

The servo controller 230 supervises a coarse position loop 234 which controls coarse head position established by the stepper motor 134 of the primary head positioner mechanism 124 in accordance with track selection values received from the data controller 208. As already mentioned, the stepper motor 132 simultaneously actuates lead screws 130 and 146 of the primary and secondary head positioner mechanisms. Since the data controller 208 will learn that a particular cartridge 102 has tape recorded in accordance with a standard track format via sensor 109, coarse position will be established either with respect to primary head 126 for a high density track pattern (FIG. 3) or with respect to secondary head 146 with respect to a particular low density pattern (FIGS. 1 or 2).

The servo controller 230 also supervises a tape reel motors servo loop 240 which controls operation of a supply reel motor 242 and a take-up reel motor 244 in order to establish desired tape velocity and maintain desired tape tension during tape travel operations of unit 100.

The servo controller 230 also supervises a servo fine position loop 250 which includes an amplifier 252 for controlling the voice coil motor 136 of the primary head position mechanism in accordance with servo information provided by optical sensor 134 during high density track format operations with tape 10A. When a low density tape 10 is sensed by sensor 109, the servo fine position loop amplifier output is switched from the primary voice coil motor 136 to the secondary voice coil motor 156 via a switch 254, and the servo fine position loop 250 then employs position information fed back from the optical sensor 166 of the secondary head positioning mechanism in order to determine and control the angle of shaft 150.

By providing switches 220 and 254, duplication of electronics circuits needed to support both the primary write/read head 126 and the secondary read-only head 144 is minimized.

Referring now to FIGS. 13, 14 and 15, the secondary tape head assembly 144 is shown in greater structural detail. The head 144 includes a generally elliptically shaped body 302 having a tape confronting front face, a back face secured to shaft 150 and eight sides. The body 302 is formed of a suitable material such as non-magnetic ceramic, e.g. calcium titanate. Other materials may also be used to form the body 302.

A tape-confronting face of the body 302 includes a raised longitudinal plateau or mesa 304 and two recessed major side surfaces or wings, a left wing 306 and a right wing 308. The wings 306 and 308, in combination with the mesa 304 enable the body to approach the tape at a very slight tape wrap angle (e.g. one degree or less) and to be rotated between positions to read back longitudinally recorded information (e.g. the FIG. 1 format) and azimuthally recorded information (e.g. the FIG. 2 format) without distorting or warping the tape. Four discrete magnetic read-only elements 310, 312, 314 and 316 are present at elongated wear regulated regions 318 of the longitudinal mesa 304. These elements may be formed in accordance with techniques described in commonly assigned U.S. Pat. No. 5,426,551 entitled: "Magnetic Contact Head Having a Composite Wear Surface, and commonly assigned U.S. Pat. No. 5,475,553 entitled: "Tape Head with Self-Regulating Wear Regions", the disclosures of these patents being incorporated herein by reference.

As shown in FIG. 14, the read-only elements 310, 312, 314 and 316 are spaced apart such that desired alignment is achieved with tracks following the longitudinal format (FIG. 1) as well as tracks following the azimuth format (FIG. 2). A plus or minus 9.1 degree rotation is employed for azimuth read out in accordance with the FIG. 2 standard track pattern. Most preferably, a distance of 0.056 inch separates the read-only elements 310 and 312 and the read-only elements 314 and 316. A distance of 0.210 inch separates element 310 from element 314, and separates element 312 from element 316. The mesa 304 is approximately 0.02 inch across and follows a radius of curvature of approximately 0.25 inch. The preferred longitudinal dimension (hl) of the head body 302 along the mesa 304 is 0.407 inch which is less than the nominal width (tw, e.g. 0.5 inch) of the tape 10. The body 302 has a transverse dimension (tw) of 0.300 inch as measured generally along the direction of tape travel. The wings 306 and 308 are recessed below the mesa 304 by a recess dimension (mh) most preferably lying in a range between five and 20 microinches. A chamfer 320 is formed along the tape facing edges of the body 302 and follows a radius of curvature of approximately 0.5 inch.

When the secondary head 144 is rotated to a tape confrontation position (FIGS. 9A, 9B or 9C) only a minimal tape wrap angle is required for operation, most preferably about one degree of tape wrap, or less. This ever-so-slight wrap angle suggests that the read-only head 144 floats in close proximity to the tape with minimized contact, ensuring minimal wear and reliable long useful life as well as effective operation with both longitudinal and azimuthal recording patterns. The minimized wrap angle also enables the head 144 to have a dimension less than the tape width without need for outriggers or other structure extending the major dimension of the head to be in excess of the tape width (tw) and aids realization of a truly compact secondary module 140.

Not all units 100 need be equipped with the secondary module 140. In multi-drive libraries, perhaps only one drive unit 100 need be equipped for backward compatibility by including the module 100. However, units 100 will be provided with structural and electrical features and functions enabling field installation of the secondary module 140, should a user require addition of the backward compatibility function after the unit 100 has been installed in the user environment. Also, since the secondary module 140 is truly modular, it may be removed and replaced in the field as a unit by a service technician with minimum disruption to operation of the drive unit 100.

It is to be understood that the particular implementations described are intended as illustrations of, and not as limiting the scope of, the claims. It will of course be appreciated that in the development of any such actual implementation, numerous implementation-specific decisions must be made to achieve the developers' specific goals, such as compliance with system-related and business-related constraints and that these goals will vary from one implementation to another. Moreover, it will be appreciated that such a development effort might be complex and time-consuming, but would nevertheless be a routine undertaking of engineering for those of ordinary skill having the benefit of this disclosure.

Although the present invention has been described in terms of the presently preferred embodiment, i.e., a backward compatible head and head positioning assembly for a one-half inch tape linear digital tape drive system, it should be clear to those skilled in the art that the present invention may also be utilized in conjunction with, for example, other tape drives employing different standard tape sizes and formats. Thus, it should be understood that the instant disclosure is not to be interpreted as limiting. Various alterations and modifications will no doubt become apparent to those skilled in the art after having read the above disclosure. Accordingly, it is intended that the appended claims should be interpreted as covering all alterations and modifications as fall within the true spirit and scope of the invention.

What is claimed is:

1. A tape unit for reading data recorded on (i) a first cartridge having a storage tape recorded in accordance with a first track layout and (ii) a second cartridge having a storage tape recorded in accordance with a second track layout, the tape unit comprising:
    a first head assembly that reads data in accordance with the first track layout;
    a second head assembly that reads data in accordance with the second track layout;
    a cartridge receiver for alternately receiving the first cartridge and the second cartridge; and
    an indicator for determining which of the cartridges is inserted into the cartridge receiver, the indicator including an optical sensor for sensing a tape hole in the storage tape of one of the cartridges.

2. The tape unit of claim 1 wherein the first head assembly includes at least one, first read element and the second head assembly includes at least one, second read element; wherein the tape unit further comprises a head channel switching means for switching between the at least one first read element and the at least one second read element.

3. The tape unit of claim 1 further comprising (i) a base, (ii) a plurality of tape guides that guide the storage tape along a tape path, and (iii) a first positioning mechanism secured to the base at a first location along the tape path, the first positioning mechanism positioning the first head assembly near the tape path.

4. The tape unit of claim 3 further comprising a second positioning mechanism secured to the base at a second location along the tape path, the second positioning mechanism positioning the second head assembly near the tape path.

5. The tape unit of claim 4 wherein the second positioning mechanism moves the second head assembly between a first position in which the second head assembly contacts the storage tape in the tape path and a second position in which the secondary head assembly does not contact the storage tape in the tape path.

6. The tape unit of claim 5 wherein the second positioning mechanism moves the second head assembly between a longitudinal playback orientation and an azimuth playback orientation.

7. A tape unit for reading data recorded on (i) a first cartridge having a storage tape recorded in accordance with a first track layout and (ii) a second cartridge having a storage tape recorded in accordance with a second track layout, the tape unit comprising:
    a first head assembly that reads data in accordance with the first track layout;
    a second head assembly that reads data in accordance with the second track layout;
    a cartridge receiver for alternately receiving the first cartridge and the second cartridge; and
    an indicator for determining which of the cartridges is inserted into the cartridge receiver, the indicator including an optical sensor for sensing the presence of an optical servo track pattern on the storage tape of one of the cartridges.

8. The tape unit of claim 7 therein the first head assembly includes at least one, first read element and the second head assembly includes at least one, second read element; wherein the tape unit further comprises a head channel switching means for switching between the at least one first read element and the at least one second read element.

9. The tape unit of claim 7 further comprising (i) a base, (ii) a plurality of tape guides that guide the storage tape along a tape path, and (iii) a first positioning mechanism secured to the base at a first location along the tape path, the first positioning mechanism positioning the first head assembly near the tape path.

10. The tape unit of claim 9 further comprising a second positioning mechanism secured to the base at a second location along the tape path, the second positioning mechanism positioning the second head assembly near the tape path.

11. The tape unit of claim 10 wherein the second positioning mechanism moves the second head assembly between a first position in which the second head assembly contacts the storage tape in the tape path and a second position in which the secondary head assembly does not contact the storage tape in the tape path.

12. The tape unit of claim 11 wherein the second positioning mechanism moves the second head assembly between a longitudinal playback orientation and an azimuth playback orientation.

13. A tape unit for reading data recorded on (i) a first cartridge having a storage tape recorded in accordance with a first track layout and (ii) a second cartridge having a storage tape recorded in accordance with a second track layout, the tape unit comprising:
    a cartridge receiver for alternately receiving the first cartridge and the second cartridge;
    an indicator for determining which of the cartridges is inserted into the cartridge receiver, the indicator including an optical sensor for sensing a tape hole in the storage tape of one of the cartridges;
    a head assembly that reads data in accordance with the second track layout; and
    a positioning mechanism that moves the head assembly between a first position in which the head assembly contacts the storage tape and a second position in which the head assembly does not contact the storage tape.

14. The tape unit of claim 13 wherein the positioning mechanism moves the head assembly to the second position when the indicator determines that the first cartridge is inserted into the cartridge receiver.

15. The tape unit of claim 13 wherein the positioning mechanism moves the head assembly to the first position when the indicator determines that the second cartridge is inserted into the cartridge receiver.

16. A tape unit for reading data recorded on (i) a first cartridge having a storage tape recorded in accordance with a first track layout and (ii) a second cartridge having a storage tape recorded in accordance with a second track layout, the tape unit comprising:

a cartridge receiver for alternately receiving the first cartridge and the second cartridge;

an indicator for determining which of the cartridges is inserted into the cartridge receiver, the indicator including an optical sensor for sensing the presence of an optical servo track pattern on the backside of the storage tape of one of the cartridges;

a head assembly that reads data in accordance with the second track layout; and a positioning mechanism that moves the head assembly between a first position in which the head assembly contacts the storage tape and a second position in which the head assembly does not contact the storage tape.

17. The tape unit of claim 16 wherein the positioning mechanism moves the head assembly to the second position when the indicator determines that the first cartridge is inserted into the cartridge receiver.

18. The tape unit of claim 16 wherein the positioning mechanism moves the head assembly to the first position when the indicator determines that the second cartridge is inserted into the cartridge receiver.

19. A tape unit for reading data recorded on (i) a first cartridge having a storage tape recorded in accordance with a first track layout and (ii) a second cartridge having a storage tape recorded in accordance with a second track layout, the tape unit comprising:

a first head assembly that reads data in accordance with the first track layout;

a second head assembly that reads data in accordance with the second track layout;

a base;

a plurality of tape guides that guide the storage tape along a tape path;

an electromechanical, first positioning mechanism that positions the first head assembly near the tape path; and an electromechanical, second positioning mechanism that positions the second head assembly near the tape path, the second positioning mechanism moving the second head assembly relative to the first head assembly.

20. A tape unit for reading data recorded on (i) a first cartridge having a storage tape recorded in accordance with a first track layout and (ii) a second cartridge having a storage tape recorded in accordance with a second track layout, the tape unit comprising:

a first head assembly that reads data in accordance with the first track layout;

a second head assembly that reads data in accordance with the second track layout;

a base;

a plurality of tape guides that guide the storage tape along a tape path;

a first positioning mechanism that positions the first head assembly near the tape path; and a second positioning mechanism that positions the second head assembly near the tape path, the second positioning mechanism moving the second head assembly relative to the first head assembly, the second positioning mechanism moving the second head assembly between a first position in which the second head assembly contacts the storage tape in the tape path and a second position in which the second head assembly does not contact the storage tape in the tape path.

21. The tape unit of claim 20 wherein the second head assembly is adapted to only read the second track layout.

22. The tape unit of claim 20 further comprising an indicator for determining which of the cartridges is inserted into the cartridge receiver and wherein the second positioning mechanism moves the second head assembly to the second position when the indicator determines that the first cartridge is inserted into the cartridge receiver.

23. The tape unit of claim 22 wherein the second positioning mechanism moves the second head assembly to the first position when the indicator determines that the second cartridge is inserted into the cartridge receiver.

24. The tape unit of claim 22 wherein the indicator senses a notch in one of the cartridges.

25. The tape unit of claim 22 wherein the indicator senses a structural feature in one of the cartridges.

26. The tape unit of claim 22 wherein the indicator senses a tape hole in the storage tape of one of the cartridges.

27. The tape unit of claim 22 wherein the indicator senses the presence of an optical servo track pattern on the storage tape of one of the cartridges.

28. The tape unit of claim 22 wherein the indicator senses the track layout on the storage tape to determine which of the cartridges is inserted into the tape unit.

* * * * *